(12) United States Patent
Kuo

(10) Patent No.: US 7,709,975 B2
(45) Date of Patent: May 4, 2010

(54) REDUNDANT POWER SUPPLY SYSTEM

(75) Inventor: Heng-Chen Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 106 days.

(21) Appl. No.: 12/043,857

(22) Filed: Mar. 6, 2008

(65) Prior Publication Data

US 2009/0174261 A1  Jul. 9, 2009

(30) Foreign Application Priority Data

Jan. 3, 2008  (CN)  .................. 2008 1 0300010

(51) Int. Cl.
*H02J 3/00* (2006.01)
(52) U.S. Cl. ....................................................... 307/80
(58) Field of Classification Search .................... 307/80
See application file for complete search history.

(56) References Cited

U.S. PATENT DOCUMENTS

2004/0217653 A1* 11/2004 Neidorff ...................... 307/80
2006/0006742 A1*  1/2006 Galm .......................... 307/87

* cited by examiner

*Primary Examiner*—Fritz M Fleming
*Assistant Examiner*—Dru M Parries
(74) *Attorney, Agent, or Firm*—Frank R. Niranjan

(57) ABSTRACT

An exemplary redundant power supply system includes a first power supply, a second power supply, a first sensor, a control circuit, and a relay switch. The control circuit includes a first input terminal connected to the first power supply via a first sensor to receive a status signal of the first power supply, a first NOT gate, a delay circuit connected to the first input terminal via the first NOT gate, a first output terminal sending a first control signal, and a second output terminal sending a second control signal. The relay switch configured to receive the two control signals from the two output terminals of the control circuit, and select the first power supply or the second power supply to supply power to an electronic device according to the two control signals.

9 Claims, 3 Drawing Sheets

REDUNDANT POWER SUPPLY SYSTEM

BACKGROUND

1. Field of the Invention

The present invention relates to a redundant power supply system.

2. Description of Related Art

Modern companies are relying more and more on their computer networks for their day to day operations. It is therefore, essential for the computer networks to be operational all of the time. A power failure can quickly bring down a computer network since all the network hubs and gateway require power to function. To ensure reliable network operation, most companies use a redundant power supply system such as uninterruptible power supplies (UPS) to protect their computer network equipment from failing during a power failure.

UPS is a device that provides battery backup when the electrical power fails or drops to an unacceptable voltage level.

SUMMARY

An exemplary redundant power supply system includes a first power supply, a second power supply, a first sensor, a control circuit, and a relay switch. The control circuit includes a first input terminal connected to the first sensor to receive a status signal of the first power supply, a first NOT gate having an input terminal connected to the first input terminal, and acting as a first output terminal of the control circuit to send a first control signal, and a delay circuit having an input terminal connected to an output terminal of the first NOT gate, and an output terminal acting as a second output terminal of the control circuit to send a second control signal. The relay switch configured to receive the two control signals from the two output terminals of the control circuit, and select the first power supply or the second power supply to supply power to an electronic device according to the two control signals.

Other advantages and novel features of the present invention will become more apparent from the following detailed description of an embodiment when taken in conjunction with the accompanying drawings, in which:

DETAILED DESCRIPTION

Figure 1:
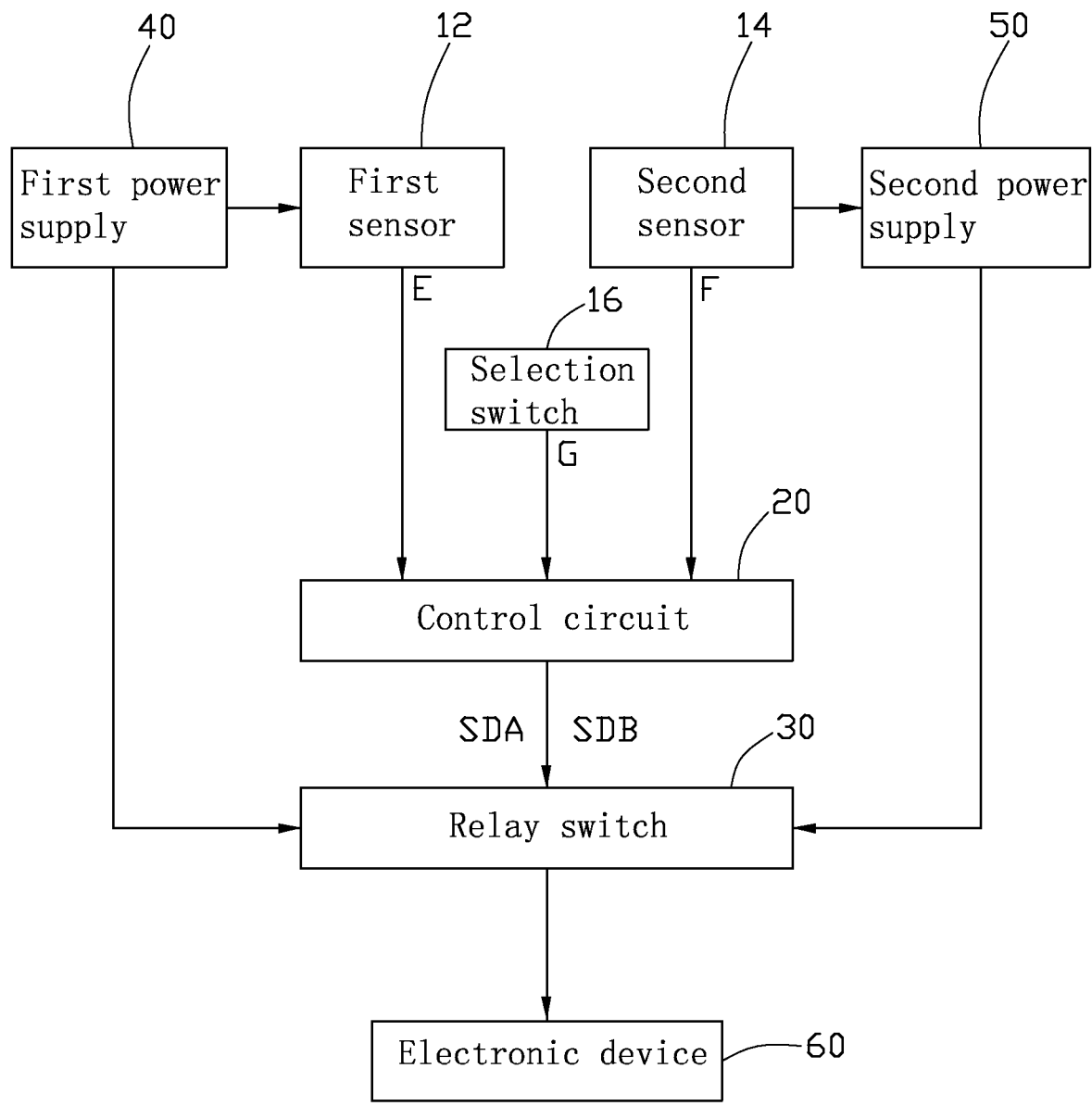
FIG. 1 is a block diagram of a redundant power supply system in accordance with an embodiment of the present invention.
Figure 2:
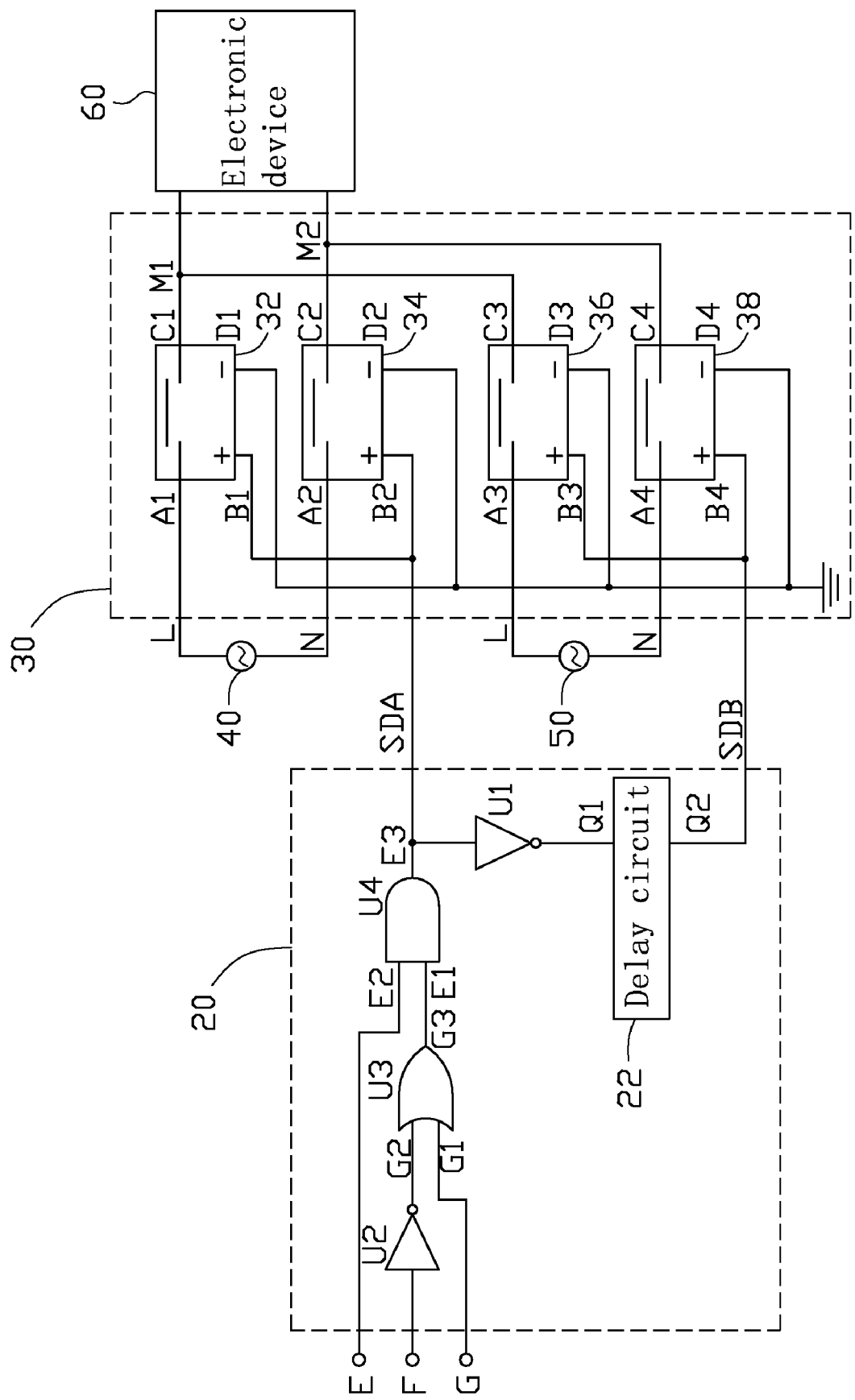
FIG. 2 is a circuit diagram of FIG. 1.

Referring to FIGS. 1 and 2, a redundant power supply system in accordance with an embodiment of the present invention includes a first sensor 12, a second sensor 14, a selection switch 16, a control circuit 20, a relay switch 30, a first power supply 40, a second power supply 50, and an electronic device 60. The first sensor 12 is a voltage sensor having a detecting terminal connected to the first power supply 40 and an output terminal E to send a first power signal. The second sensor 14 is a voltage sensor having a detecting terminal connected to the second power supply 50 and an output terminal F to send a second power signal. Both the first power supply 40 and the second power supply 50 are alternating current power supplies. The selection switch 16 has an output terminal G to send a selection signal. The control circuit 20 has three input terminals connected to the output terminals E~G of the first sensor 12, the second sensor 14, and the selection switch 16 respectively, a first output terminal SDA, and a second output terminal SDB.

In the embodiment, when the first power supply 40 works normally, the first power signal is a high level voltage signal; and when the first power supply does not work, the first power signal is a low level voltage signal. If the second power supply 50 works normally, the second power signal is a high level voltage signal; if not, the second power signal is a low level voltage signal. When the selection switch 16 is turned on to select the first power supply 40, the selection signal is a high level voltage signal, and when the selection switch 16 is turned off to select the second power supply 50, the selection signal is a low level voltage signal.

The control circuit 20 includes a first NOT gate U1, a second NOT gate U2, an OR gate U3 having two input terminals G1~G2 and an output terminal G3, an AND gate U4 having two input terminals E1~E2 and an output terminal E3, and a delay circuit 22 having an input terminal Q1 and an output terminal Q2. The input terminal G1 of the OR gate U3 is connected to the output terminal G of the selection switch 16, the other input terminal G2 of the OR gate U3 is connected to the output terminal F of the second sensor 14 via the second NOT gate U2, the output terminal G3 of the OR gate U3 and the output terminal E of the first sensor 12 are connected to the input terminals E1~E2 of the AND gate U4 respectively, the input terminal Q1 of the delay circuit 22 is connected to the output terminal E3 of the AND gate U4 via the first NOT gate U1. The output terminal E3 of the AND gate U4 and the output terminal Q2 of the delay circuit 22 act as the first output terminal SDA and the second output terminal SDB of the control circuit 20 respectively, and are connected to the relay switch 30.

The relay switch 30 comprises a first solid state relay 32, a second solid state relay 34, a third solid state relay 36, and a fourth solid state relay 38. The first solid state relay 32 has a first input terminal A1, a second input terminal B1, a first output terminal C1, and a second output terminal D1; the second solid state relay 34 has a first input terminal A2, a second input terminal B2, a first output terminal C2, and a second output terminal D2; the third solid state relay 36 has a first input terminal A3, a second input terminal B3, a first output terminal C3, and a second output terminal D3; and the fourth solid state relay 38 has a first input terminal A4, a second input terminal B4, a first output terminal C4, and a second output terminal D4. The first input terminals A1~A2 of the first solid state relay 32 and the second solid state relay 34 are coupled to a live wire L and a neutral wire N of the first power supply 40 respectively, the first input terminals A3~A4 of the third solid state relay 36 and the fourth solid state relay 38 are coupled to a live wire L and a neutral wire N of the second power supply 50 respectively. The second input terminals B1~B2 of the first solid state relay 32 and the second solid state relay 34 are coupled to the first output terminal SDA of the control circuit 20 to receive a first control signal, the second input terminals B3~B4 of the third solid state relay 36 and the fourth solid state relay 38 are coupled to the second output terminal SDB of the control circuit 20 to receive a second control signal. The first output terminals C1~C3 of the first solid state relay 32 and the third solid state relay 36 are coupled to a first output terminal M1 of the relay switch 30, the first output terminals C2~C4 of the second solid state relay 34 and the fourth solid state relay 38 are coupled to a second output terminal M2 of the relay switch 30, the second output terminals D1~D4 of four solid state relays are grounded, the first output terminal M1 and the second output terminal M2 of the relay switch 30 are coupled to the electronic device 60.

Therefore, when the first output terminal SDA of the control circuit 20 sends a high level voltage signal and the second output terminal SDB of the control circuit 20 sends a low level voltage signal to the corresponding input terminals of the relay switch 30, the first solid state relay 32 and the second solid state relay 34 turn on, and the third solid state relay 36 and the fourth solid state relay 38 turn off, and the first power supply 40 is coupled to the electronic device 60 via the relay switch 30; and when the first output terminal SDA of the control circuit 20 sends a low level voltage signal and the second output terminal SDB of the control circuit 20 sends a high level voltage signal to the corresponding input terminals of the relay switch 30, the first solid state relay 32 and the second solid state relay 34 turn off, and the third solid state relay 36 and the fourth solid state relay 38 turn on, and the second power supply 50 is coupled to the electronic device 60 via the relay switch 30.

When the first power supply 40 and the second power supply 50 both work normally, the first and the second power signals are high level voltage signals. Therefore, if the selection switch 16 is turned on, the control signals generated by the first output terminal SDA and the second output terminal SDB of the control circuit 20 are high and low respectively, and the first power supply 40 is coupled to the electronic device 60. If the selection switch is turned off, the control signals generated from the first output terminal SDA of the control circuit 20 is a low level voltage signal and the second output terminal SDB of the control circuit 20 is a high level voltage signal, and the second power supply 50 is coupled to the electronic device 60.

When the first power supply 40 works normally and the second power supply 50 is turned off, the first power signal is a high level voltage signal and the second power signal is a low level voltage signal. Therefore, the control signals generated from the first output terminal SDA of the control circuit 20 is a high level voltage signal and the second output terminal SDB of the control circuit 20 is a low level voltage signal no matter if the selection switch 16 is turned on or off, and the first power supply 40 is coupled to the electronic device 60 via the relay switch 30.

When the first power supply 40 is turned off and the second power supply 50 works normally, the first power signal is a low level voltage signal and the second power signal is a high level voltage signal. Therefore, the control signals generated from the first output terminal SDA of the control circuit 20 is a low level voltage signal and the second output terminal SDB of the control circuit 20 is a high level voltage signal no matter if the selection switch 16 is turned on or off, and the second power supply 50 is coupled to the electronic device 60 via the relay switch 30.

In this embodiment, the delay time of the delay circuit 22 is can be set anywhere from approximately 8.0 ms to 10.0 ms depending on the frequencies of the first power supply 40 and the second power supply 50. For example, if the frequencies are 50 Hz then 8.3 ms is advantageous, on the other hand, if the frequencies are 60 Hz then 10 ms would be advantageous.

Figure 3:
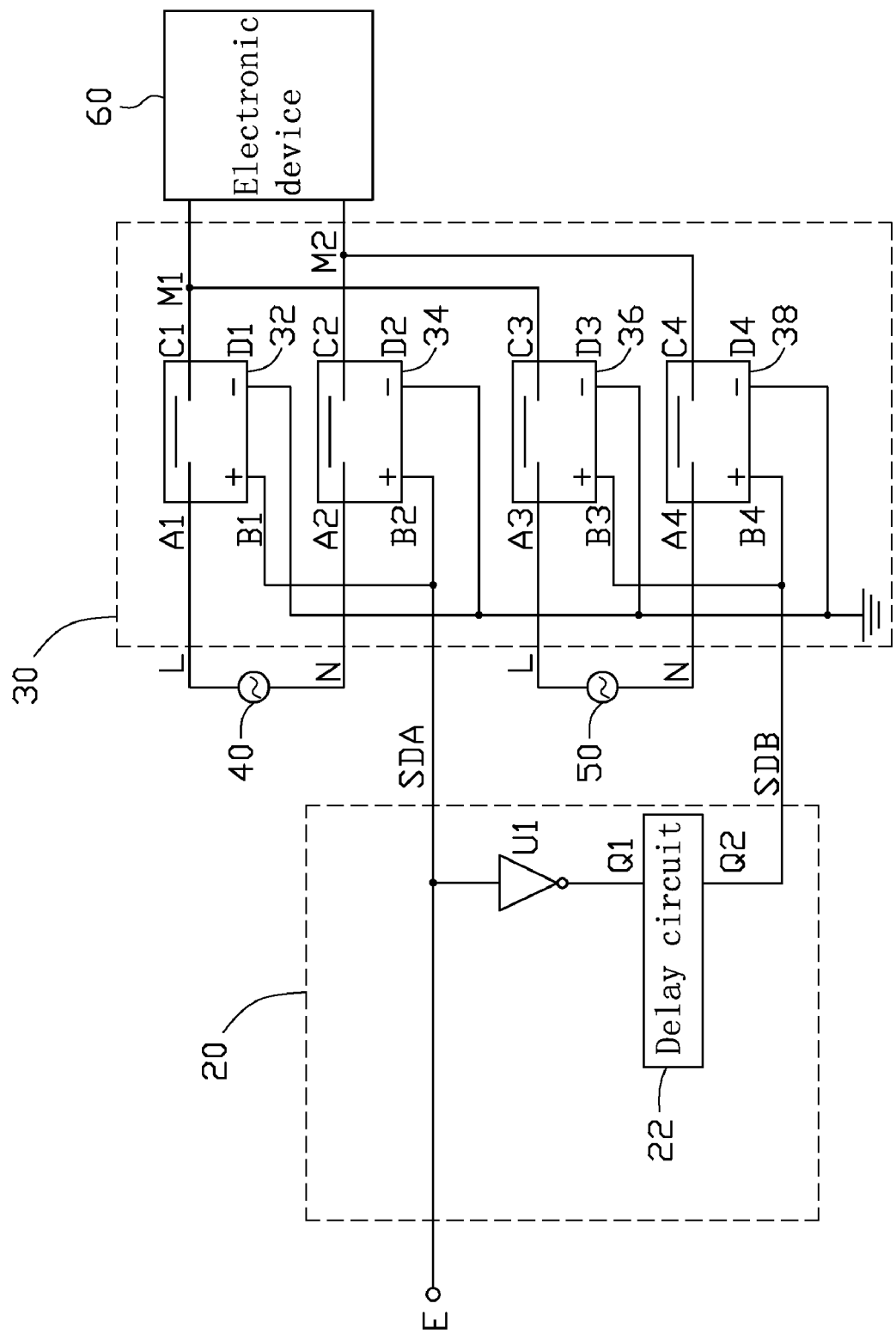
FIG. 3 is a circuit diagram of another embodiment of the present invention.

Referring to FIG. 3, in another embodiment of the present invention, the second sensor 14 and the selection switch 16 in FIG. 1 are omitted, and the control circuit 20 only includes the first NOT gate U1 and the delay circuit 22 comprising an input terminal Q1 and an output terminal Q2. The input terminal Q1 of the delay circuit 22 is connected to the output terminal E of the first sensor 12 via the first NOT gate U1. The output terminal E of the first sensor 12 and the output terminal Q2 of the delay circuit 22 act as a first output terminal SDA and a second output terminal SDB of the control circuit 20 respectively, and are connected to the relay switch 30. The other circuits and connections are the same as shown in FIG. 2.

In the present embodiment, the first power supply 40 is a main power supply and the second power supply 50 is a backup power supply. When the first power supply 40 works normally, the first power signal is a high level voltage signal, therefore, the control signals generated from the first output terminal SDA of the control circuit 20 is a high level voltage signal and the second output terminal SDB of the control circuit 20 is a low level voltage signal, and the first power supply 40 is coupled to the electronic device 60; and when the first power supply 40 is turned off, the first power signal is a low level voltage signal, therefore, the control signals generated from the first output terminal SDA of the control circuit 20 is a low level voltage signal and the second output terminal SDB of the control circuit 20 is a high level voltage signal, and the second power supply 50 is coupled to the electronic device 60 via the relay switch 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A redundant power supply system comprising:
 a first power supply;
 a second power supply;
 a first sensor connected to the first power supply;
 a control circuit comprising a first input terminal connected to the first sensor to receive a status signal of the first power supply, a first NOT gate having an input terminal connected to the first input terminal, and acting as a first output terminal of the control circuit to send a first control signal, and a delay circuit having an input terminal connected to an output terminal of the first NOT gate, and an output terminal acting as a second output terminal of the control circuit to send a second control signal; and
 a relay switch configured to receive the two control signals from the two output terminals of the control circuit, and select the first power supply or the second power supply to supply power to an electronic device according to the two control signals;
 wherein the relay switch comprises a first solid state relay, a second solid state relay, a third solid state relay, and a fourth solid state relay, each solid state relay has a first input terminal, a second input terminal, a first output terminal, and a second output terminal, the first input terminals of the first solid state relay and the second solid state relay are coupled to a live wire and a neutral wire of the first power supply respectively, the first input terminals of the third solid state relay and the fourth solid state relay are coupled to a live wire and a neutral wire of the second power supply respectively, the second input terminals of the first solid state relay and the second solid state relay are coupled to the first output terminal of the control circuit, the second input terminals of the third solid state relay and the fourth solid state relay are coupled to the second output terminal of the control circuit, the first output terminals of the first solid state relay and the third solid state relay are coupled to a first output terminal of the relay switch, the first output terminals of the second solid state relay and the fourth solid state relay are coupled to a second output terminal of the relay switch, all the second output terminals of the solid state relays are grounded, the first output terminal and the second output terminal of the relay switch are coupled to the electronic device.

2. The redundant power supply system as claimed in claim 1, wherein the first power supply and the second power supply are alternating current power supplies.

3. The redundant power supply system as claimed in claim 1, wherein the first sensor is a voltage sensor.

4. The redundant power supply system as claimed in claim 1, wherein a delay time of the delay circuit is set from 8.0 ms to 10.0 ms.

5. A redundant power supply system comprising:
a first power supply;
a second power supply;
a first sensor connected to the first power supply;
a second sensor connected to the second power supply;
a control circuit comprising:
   a first input terminal connected to the first sensor to receive a status signal of the first power supply;
   a second input terminal connected to the second sensor to receive a status signal of the second power supply;
   a third input terminal connected to a selection switch to receive a selection signal from the selection switch;
   a first NOT gate;
   a second NOT gate;
   an OR gate comprising a first input connected to the third input terminal, and a second input connected to the second input terminal via the first NOT gate;
   an AND gate comprising a first input connected to an output of the OR gate, a second input connected to the first input terminal, and an output acting as the first output terminal of the control circuit to send a first control signal; and
   a delay circuit comprising an input connected to the output of the AND gate via the second NOT gate, and an output acting as a second output terminal of the control circuit to send a second control signal; and a relay switch configured to receive the two control signals from the two output terminals of the control circuit, and select the first power supply or the second power supply to supply power to an electronic device according to the two control signals.

6. The redundant power supply system as claimed in claim 5, wherein the relay switch comprises a first solid state relay, a second solid state relay, a third solid state relay, and a fourth solid state relay, each solid state relay has a first input terminal, a second input terminal, a first output terminal, and a second output terminal, the first input terminals of the first solid state relay and the second solid state relay are coupled to a live wire and a neutral wire of the first power supply respectively, the first input terminals of the third solid state relay and the fourth solid state relay are coupled to a live wire and a neutral wire of the second power supply respectively, the second input terminals of the first solid state relay and the second solid state relay are coupled to the first output terminal of the control circuit, the second input terminals of the third solid state relay and the fourth solid state relay are coupled to the second output terminal of the control circuit, the first output terminals of the first solid state relay and the third solid state relay are coupled to a first output terminal of the relay switch, the first output terminals of the second solid state relay and the fourth solid state relay are coupled to a second output terminal of the relay switch, all the second output terminals of the solid state relays are grounded, the first output terminal and the second output terminal of the relay switch are coupled to the electronic device.

7. The redundant power supply system as claimed in claim 5, wherein each of the first power supply and the second power supply is an alternating current power supplies.

8. The redundant power supply system as claimed in claim 5, wherein each of the first sensor and the second sensor is a voltage sensor.

9. The redundant power supply system as claimed in claim 5, wherein a delay time of the delay circuit is set from 8.0 ms to 10.0 ms.

* * * * *